(12) United States Patent
Martin

(10) Patent No.: US 11,359,710 B1
(45) Date of Patent: Jun. 14, 2022

(54) DRIVE BELT TENSIONING SYSTEM FOR AIR-COOLED HEAT EXCHANGERS

(71) Applicant: Harsco Technologies LLC, Fairmont, MN (US)

(72) Inventor: Indian Martin, Tulsa, OK (US)

(73) Assignee: Hudson Products Corporation, Ball Ground, GA (US)

( * ) Notice: Subject to any disclaimer, the term of this patent is extended or adjusted under 35 U.S.C. 154(b) by 237 days.

(21) Appl. No.: 16/429,977

(22) Filed: Jun. 3, 2019

Related U.S. Application Data

(60) Provisional application No. 62/679,319, filed on Jun. 1, 2018.

(51) Int. Cl.
*F16H 55/54* (2006.01)
*F02B 67/06* (2006.01)
*F16H 7/08* (2006.01)

(52) U.S. Cl.
CPC ............. *F16H 55/54* (2013.01); *F02B 67/06* (2013.01); *F16H 7/08* (2013.01)

(58) Field of Classification Search
CPC .. F16H 7/12; F16H 7/1263; F16H 2007/0842; F16H 2007/088; F16H 2007/0891
USPC ................................ 474/113, 119, 124, 126
See application file for complete search history.

(56) References Cited

U.S. PATENT DOCUMENTS

| | | | | |
|---|---|---|---|---|
| 642,242 A | * | 1/1900 | Miller | F16H 7/14 474/113 |
| 732,238 A | * | 6/1903 | Turbayne | H02P 9/007 322/43 |
| 1,220,304 A | * | 3/1917 | Welffens | F16H 7/14 474/113 |
| 1,322,543 A | * | 11/1919 | Clark | F16H 7/00 474/61 |
| 1,507,238 A | * | 9/1924 | Kocourek | F16H 7/14 474/113 |
| 2,184,541 A | * | 12/1939 | Aikman | F16H 7/14 248/656 |
| 2,205,176 A | * | 6/1940 | Sauer | F16H 9/14 474/115 |
| 2,386,883 A | * | 10/1945 | Ames | F24F 1/027 62/280 |
| 2,504,624 A | * | 4/1950 | Barnes | G05G 15/08 474/109 |
| 2,578,662 A | * | 12/1951 | Bader | B24B 21/14 451/311 |

(Continued)

*Primary Examiner* — Henry Y Liu
(74) *Attorney, Agent, or Firm* — Cook Alex Ltd.

(57) ABSTRACT

An air-cooled heat exchanger has a frame assembly, a plenum supported by the frame assembly, an engine and a fan assembly. The engine includes a drive shaft and the fan assembly includes a fan connected to a fan shaft. The fan assembly is configured to move air through the plenum. The air-cooled heat exchanger also includes a drive assembly connected between the engine and the fan assembly. The drive assembly has a fan shaft sheave connected to the fan shaft, a driver sheave connected to the drive shaft, an idler pulley, and a drive belt in contact with the fan shaft sheave, driver sheave and idler pulley. The air-cooled heat exchanger has an idler bearing adjustment mechanism that is configured to adjust tension on the drive belt by adjusting the position of the idler pulley relative to the drive belt.

9 Claims, 6 Drawing Sheets

(56) References Cited

U.S. PATENT DOCUMENTS

| | | | | |
|---|---|---|---|---|
| 2,823,937 A * | 2/1958 | La Barre | F16H 7/02 | 474/113 |
| 2,833,597 A * | 5/1958 | Sloyanjerome | F16C 29/00 | 384/38 |
| 2,833,598 A * | 5/1958 | Sloyanjerome | F16H 7/14 | 384/49 |
| 2,970,587 A * | 2/1961 | Estes | F01P 5/04 | 123/195 E |
| 3,415,238 A * | 12/1968 | Wagner | F02B 67/06 | 123/195 R |
| 3,586,273 A * | 6/1971 | Sloyan | F16M 7/00 | 248/657 |
| 3,702,570 A * | 11/1972 | Stikkers | F16H 7/14 | 474/89 |
| 3,814,358 A * | 6/1974 | Sloyan | F16M 3/00 | 248/655 |
| 3,893,646 A * | 7/1975 | Sloyan | F16M 7/00 | 248/657 |
| 3,922,927 A * | 12/1975 | Shiki | F02B 67/06 | 474/113 |
| 3,995,442 A * | 12/1976 | Cavezza | F24F 1/02 | 62/259.1 |
| 4,249,425 A * | 2/1981 | Watson | F16H 7/129 | 474/110 |
| 4,274,845 A * | 6/1981 | Howard | F28G 9/00 | 96/228 |
| 4,437,648 A * | 3/1984 | Thorn | B25B 25/00 | 254/133 R |
| 4,571,221 A * | 2/1986 | Isobe | F16H 7/14 | 474/101 |
| 4,618,336 A * | 10/1986 | Isobe | F16H 7/14 | 474/113 |
| 4,889,519 A * | 12/1989 | Band | G01B 5/0002 | 474/101 |
| 5,002,518 A * | 3/1991 | Pennatto | F16H 7/10 | 474/113 |
| 5,046,676 A * | 9/1991 | McClintock | F16H 7/1263 | 474/113 |
| 5,161,939 A * | 11/1992 | Stadler | F04D 17/16 | 415/177 |
| 5,791,876 A * | 8/1998 | Moser | F04D 25/02 | 416/169 A |
| 6,030,305 A * | 2/2000 | Hood | F16H 7/14 | 474/109 |
| 6,652,336 B1 * | 11/2003 | Chambers | B63H 20/14 | 440/75 |
| 7,338,400 B2 * | 3/2008 | Pierjok | F16H 7/14 | 417/359 |
| 8,910,917 B1 * | 12/2014 | Bees | F16M 7/00 | 248/657 |
| 8,974,332 B2 * | 3/2015 | Hood | F16H 7/1263 | 474/110 |
| 9,803,726 B2 * | 10/2017 | Lindsay | F16M 11/2092 | |
| 9,806,583 B2 * | 10/2017 | Norris | H02K 5/26 | |
| 10,066,709 B2 * | 9/2018 | Greer | F16H 7/02 | |
| 2002/0039946 A1 * | 4/2002 | Serkh | F16H 7/1218 | 474/136 |
| 2006/0198739 A1 * | 9/2006 | Brenneke | F04D 25/166 | 417/362 |
| 2007/0033957 A1 * | 2/2007 | Taras | F25B 49/02 | 62/183 |
| 2009/0191069 A1 * | 7/2009 | Dubensky | F04D 29/601 | 417/359 |
| 2010/0193163 A1 * | 8/2010 | Rollins | F28B 1/06 | 165/121 |
| 2011/0165980 A1 * | 7/2011 | Hoeting | F16H 7/14 | 474/114 |
| 2011/0294614 A1 * | 12/2011 | Bigler | F16H 7/1281 | 474/133 |
| 2014/0057747 A1 * | 2/2014 | Hood | F16H 7/1263 | 474/110 |
| 2015/0204425 A1 * | 7/2015 | Lindsay | F16M 11/2092 | 474/117 |
| 2015/0280514 A1 * | 10/2015 | Norris | H02K 5/26 | 474/115 |
| 2016/0069624 A1 * | 3/2016 | Rollins | F04D 25/06 | 415/122.1 |
| 2020/0340552 A1 * | 10/2020 | Koka | F24F 11/77 | |
| 2020/0340553 A1 * | 10/2020 | Salunkhe | F04D 25/02 | |
| 2020/0340554 A1 * | 10/2020 | Salunkhe | F16H 7/1281 | |

\* cited by examiner

DRIVE BELT TENSIONING SYSTEM FOR AIR-COOLED HEAT EXCHANGERS

RELATED APPLICATIONS

This application claims the benefit of U.S. Provisional Patent Application Ser. No. 62/679,319 filed Jun. 1, 2018 and entitled, "Improved Drive Belt Tensioning System for Air-Cooled Heat Exchangers," the entire disclosure of which is herein incorporated by reference.

FIELD OF THE INVENTION

The present invention generally relates to air-cooled heat exchangers, and more particularly, but not by way of limitation, to an improved system for transmitting torque from an engine to the fan of the air-cooled heat exchanger.

BACKGROUND OF THE INVENTION

Air-cooled heat exchangers are used in a wide variety of industrial applications. A process fluid, either a gas or a liquid, is passed through a series of cooling tubes while air is mechanically passed over the exterior of the cooling tubes. The air absorbs heat from the cooling tubes, thereby lowering the temperature of the fluid within the tubes. The cooling tubes may include lateral or axial fins to aid in heat transfer.

In a typical air-cooled heat exchanger, a large fan is used to force or draw air at ambient conditions through a plenum fabricated from a series of panels supported by an underlying frame assembly. The plenum directs the ambient air through the cooling tube assembly, which includes header boxes located on opposite sides of the plenum. The header boxes include inlets and outlets to permit the flow of the process fluid through the heat exchanger. In some applications, a series of adjustable louvers are positioned downstream and/or upstream from the cooling tubes to control the flow of air across the cooling tube assembly.

The fan is typically driven by an external engine. A fan shaft extends from the fan through the cooling tubes assembly and plenum to a drive assembly on the exterior of the air-cooled heat exchanger proximate the engine. As noted in the PRIOR ART drawing in FIG. 1, conventional drive assemblies 200 include a series of intermediate shafts, sheaves and bearings that reduce the speed of the rotational output from the engine while increasing the torque applied to the fan shaft. The prior art drive assembly 200 includes a fan shaft 202, fan shaft sheave 204, driver sheave 206, drive shaft 208, idler pulley assembly 210 and drive belt 212. The idler pulley assembly 210 includes an idler pulley 214 that resides inside the drive belt 212. In this conventional design, the tension applied to the drive belt 212 is increased by drawing the idler pulley 214 outward away from the fan shaft sheave 204 and driver sheave 206.

Although widely adopted, the use of the prior art drive assembly 200 may present several problems. In some cases, increasing the tension on the drive belt 212 decreases the "belt wrap" around the fan shaft sheave 204. This may reduce the frictional contact between the drive belt 212 and the fan shaft sheave 204. In high torque applications, belt slippage caused by a reduced frictional interface between the drive belt 212 and the fan shaft sheave 204 may accelerate wear on the drive belt 212. Additionally, the placement of the drive belt 212 around the idler pulley 214 complicates replacement of the drive belt 212 and other components within the drive assembly 200. The presently preferred embodiments are directed to these and other deficiencies in the prior art.

SUMMARY OF THE INVENTION

In one embodiment, the present invention includes an air-cooled heat exchanger that has a frame assembly, a plenum supported by the frame assembly, an engine and a fan assembly. The engine includes a drive shaft and the fan assembly includes a fan connected to a fan shaft. The fan assembly is configured to move air through the plenum. The air-cooled heat exchanger also includes a drive assembly connected between the engine and the fan assembly. The drive assembly has a fan shaft sheave connected to the fan shaft, a driver sheave connected to the drive shaft, an idler pulley, and a drive belt in contact with the fan shaft sheave, driver sheave and idler pulley. The air-cooled heat exchanger has an idler bearing adjustment mechanism that is configured to adjust tension on the drive belt by adjusting the position of the idler pulley relative to the drive belt.

In another embodiment, the present invention includes an air-cooled heat exchanger that has a frame assembly, a plenum supported by the frame assembly, an engine having a drive shaft and a fan assembly configured to move air through the plenum. The fan assembly has a fan connected to a fan shaft. The air-cooled heat exchanger also includes a drive assembly connected between the engine and the fan assembly. The drive assembly has a fan shaft sheave connected to the fan shaft, a driver sheave connected to the drive shaft, an idler pulley and a drive belt having an inner side and an outer side. The inner side of the drive belt contacts the fan shaft sheave and the driver sheave, and the outer side of the drive belt contacts the idler pulley. The air-cooled heat exchanger further includes an idler bearing adjustment mechanism configured to adjust the position of the idler pulley relative to the drive belt.

In yet another embodiment, the present invention includes an air-cooled heat exchanger that has a frame assembly, a plenum supported by the frame assembly, an engine with a drive shaft, and a fan assembly configured to move air through the plenum. The fan assembly has a fan connected to a fan shaft. The air-cooled heat exchanger further includes a drive assembly connected between the engine and the fan assembly. The drive assembly includes a fan shaft sheave connected to the fan shaft, where the fan shaft sheave has a width, a driver sheave connected to the drive shaft, an idler pulley, and a drive belt in contact with the fan shaft sheave, the driver sheave and the idler pulley. The drive belt follows a drive belt path that does not extend beyond the width of the fan shaft sheave. The air-cooled heat exchanger also has an idler bearing adjustment mechanism configured to adjust the position of the idler pulley relative to the fan shaft.

WRITTEN DESCRIPTION

Figure 1:
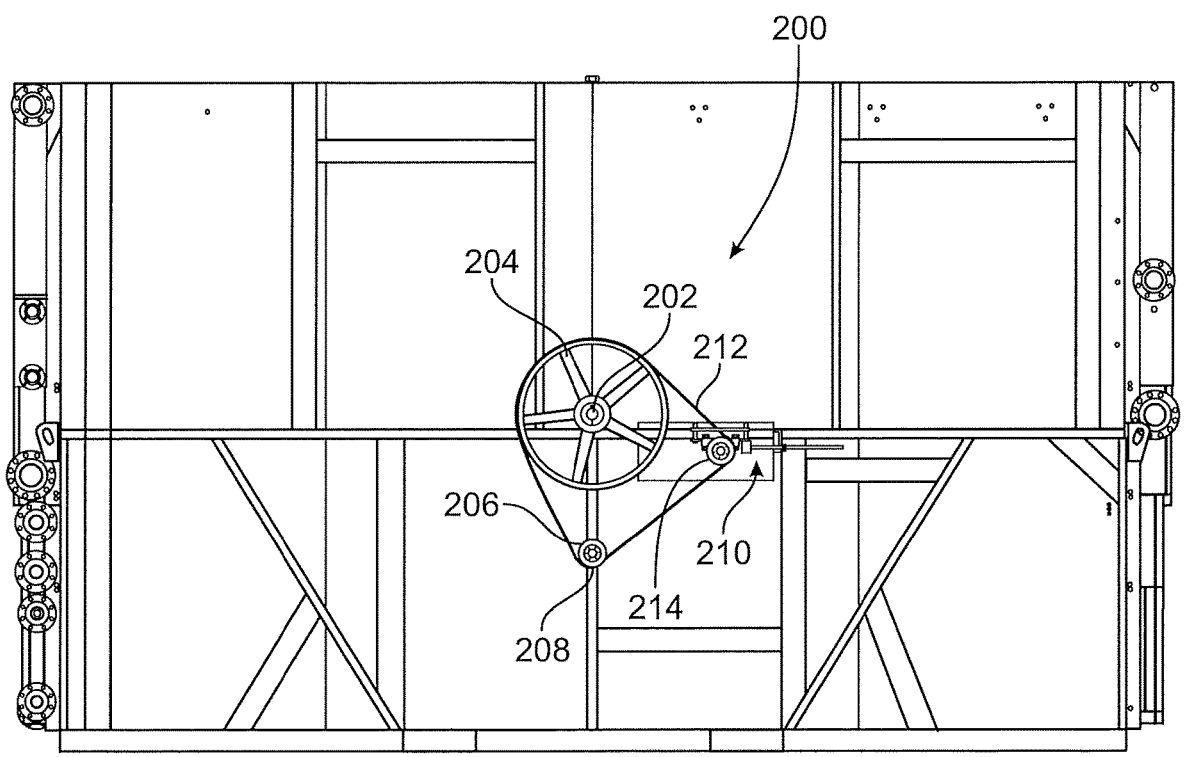
FIG. 1 provides a side view of a PRIOR ART air-cooled heat exchanger and drive assembly.
Figure 2:
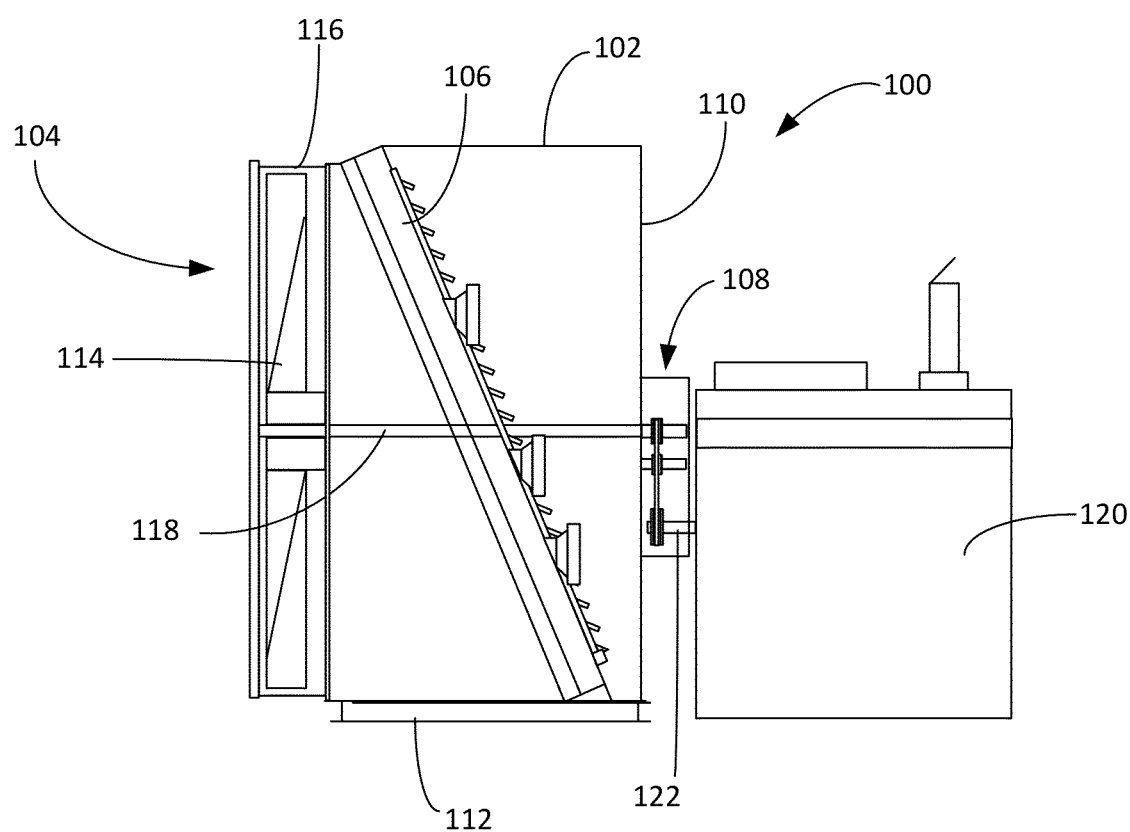
FIG. 2 is a side view of an air-cooled heat exchanger, constructed in accordance with an exemplary embodiment.
Figure 3:
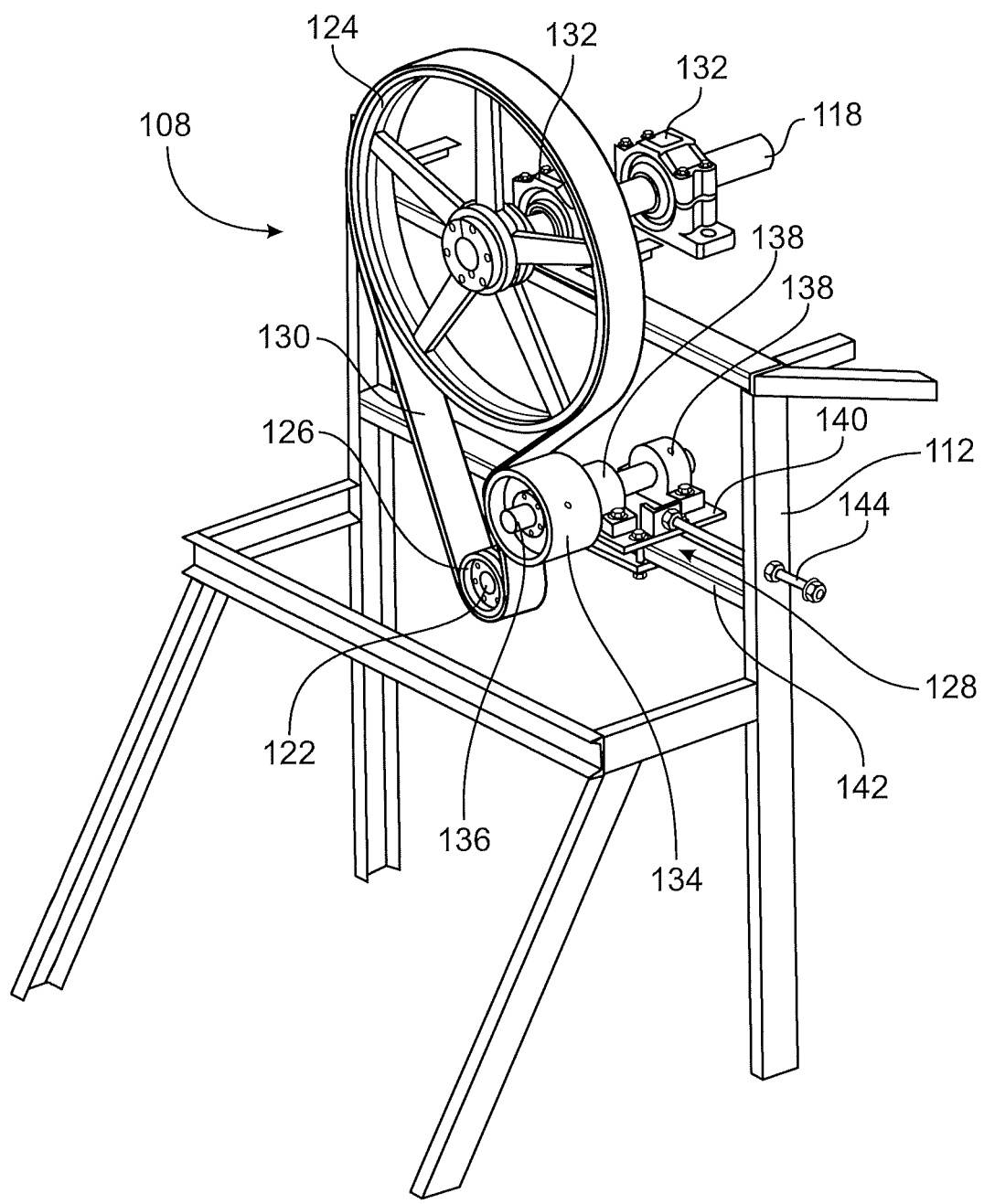
FIG. 3 is a perspective view of the drive assembly from the air-cooled heat exchanger of FIG. 2.
Figure 4:
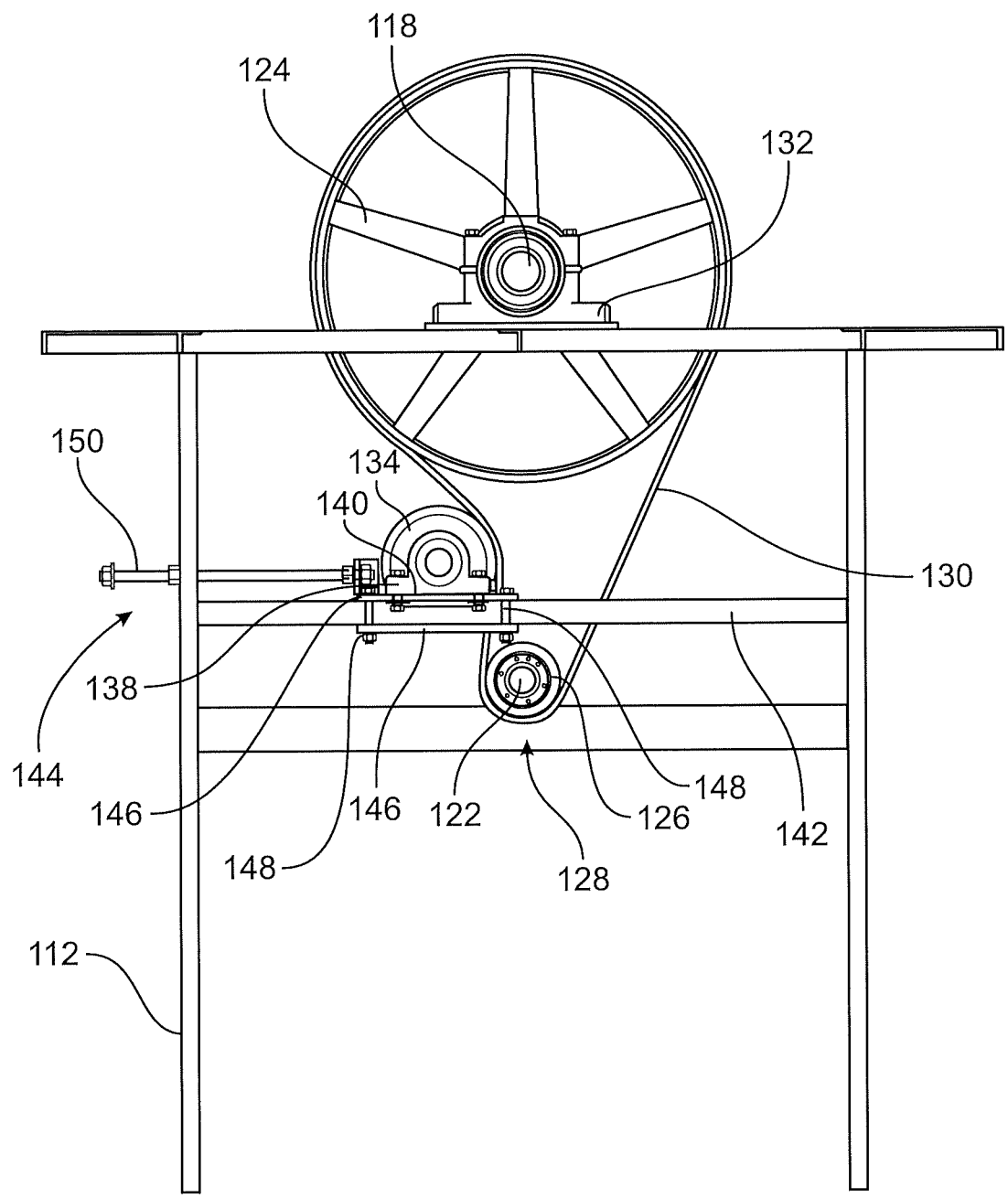
FIG. 4 is an external view of the drive assembly from the air-cooled heat exchanger of FIG. 2.
Figure 5:
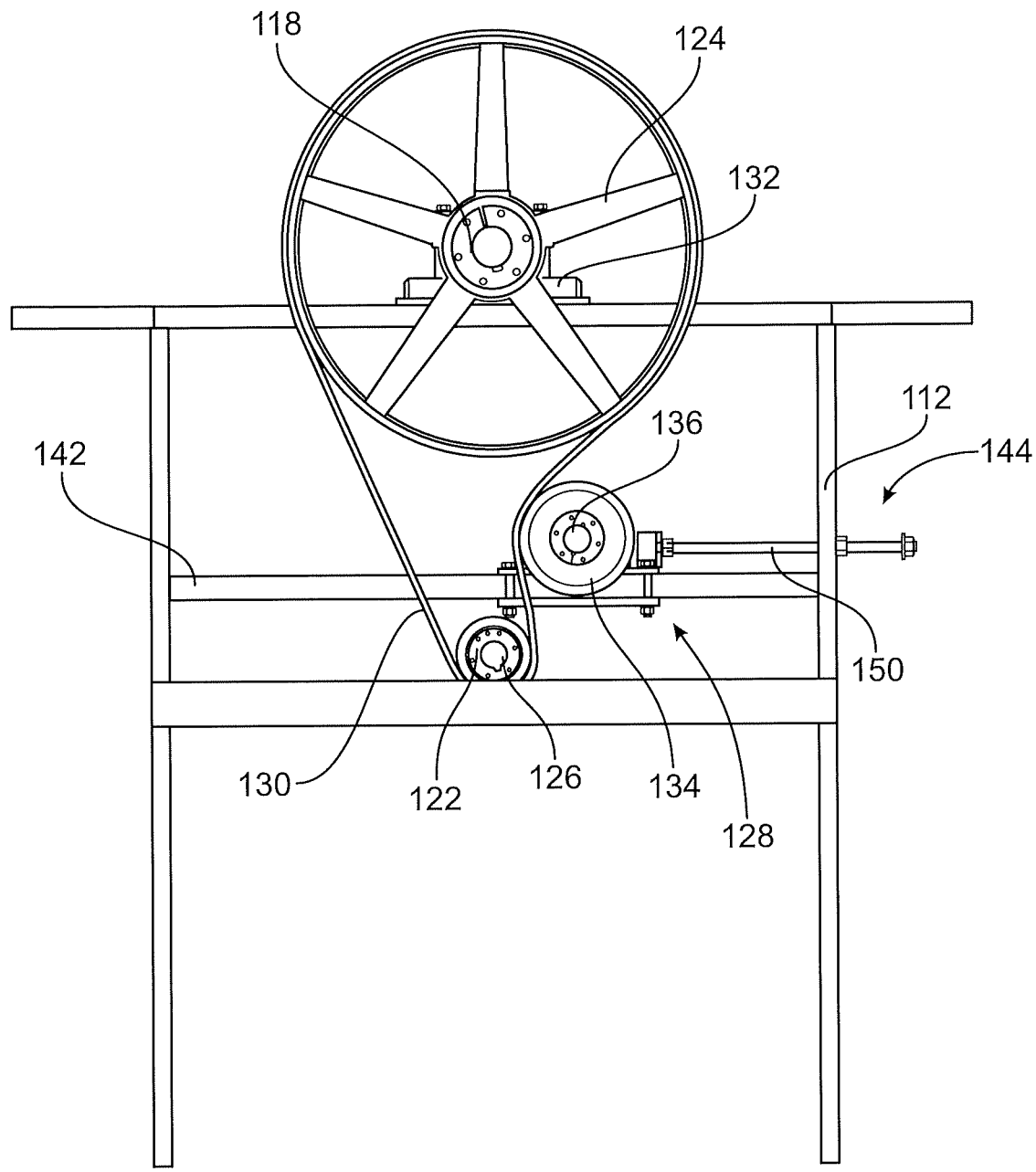
FIG. 5 is an internal view of the drive assembly from the air-cooled heat exchanger of FIG. 2.
Figure 6:
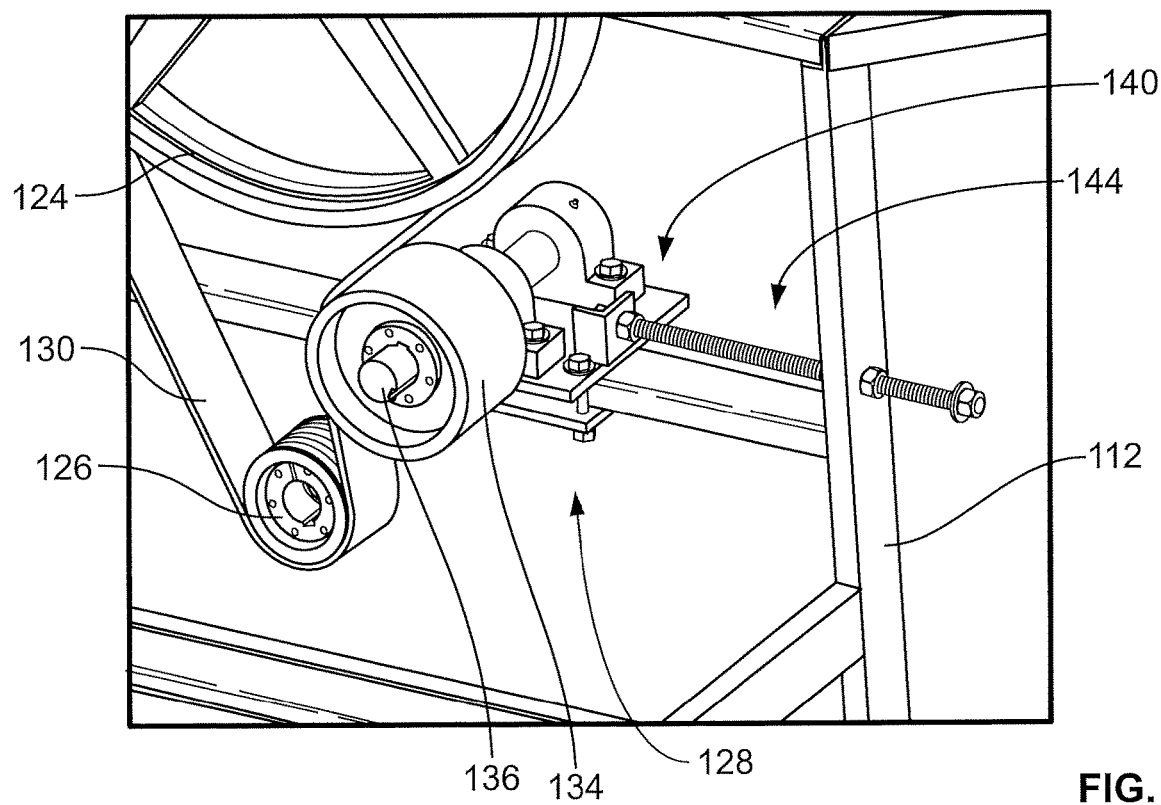
FIG. 6 is a close-up perspective view of the belt-tensioning system from the drive assembly of FIG. 4.
Figure 7:
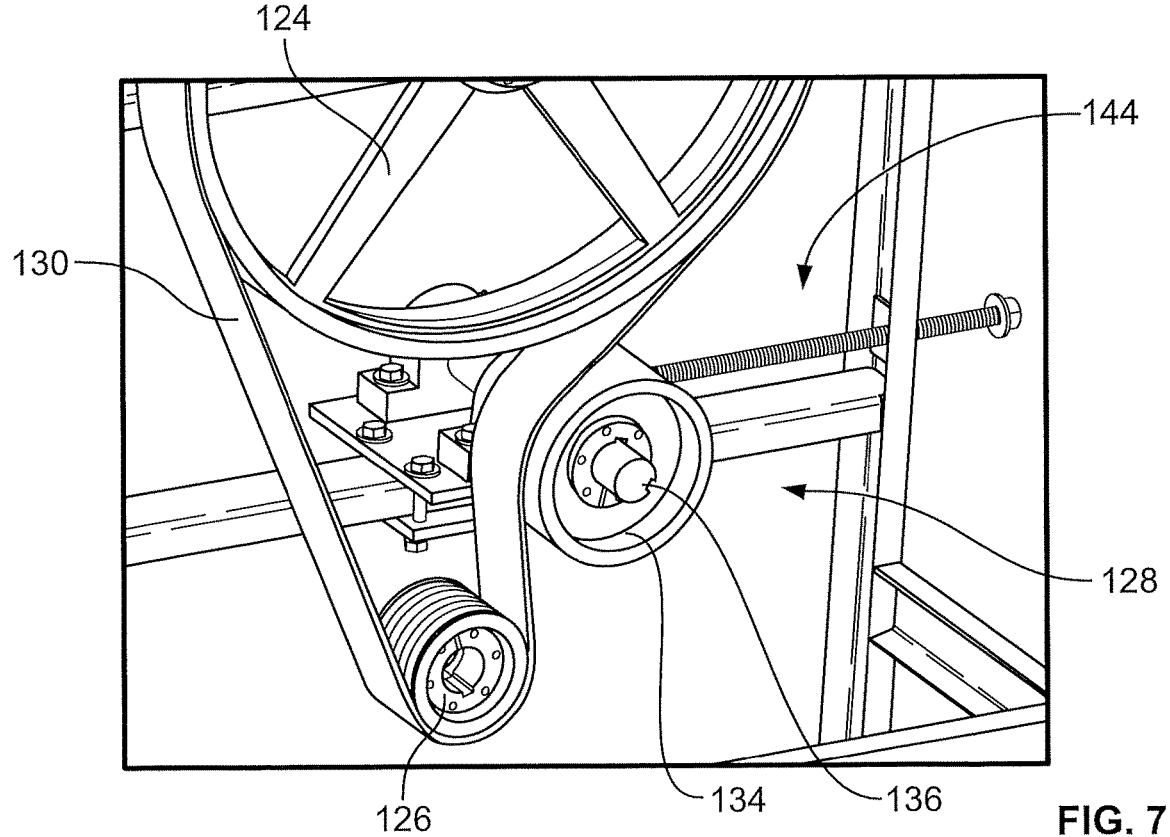
FIG. 7 is a close-up perspective view of the belt-tensioning system from the drive assembly of FIG. 4.

Referring to FIG. 2, shown therein is a side view of an air-cooled heat exchanger 100 constructed in accordance with an exemplary embodiment. The air-cooled heat exchanger 100 generally includes a plenum 102, a fan assembly 104, cooling tubes assembly 106 and a drive assembly 108. As depicted, the air-cooled heat exchanger 100 is configured as a forced-draft unit in which ambient air is forced by the fan assembly 104 into the front of the plenum 102, through the cooling tubes assembly 106, and out the top of the plenum 102. In alternate embodiments, the air-cooled heat exchanger 100 is an induced draft air design in which air is drawn across the cooling tubes assembly 106.

The plenum 102 includes a series of panels 110 that are attached to a frame assembly 112. The panels 110 and frame assembly 112 are preferably constructed from metal or other durable materials. The frame assembly 112 may include a base constructed from "I-beams" and a structural skeleton that includes a plurality of trusses, struts and beams (not separately designated). Some of the panels 110 have been removed to reveal the internal components of the cooling tubes assembly 106, fan assembly 104 and drive assembly 108.

The fan assembly 104 includes a fan 114 and a fan shroud 116 that is connected to the plenum 102. A fan shaft 118 connects the fan 114 to the drive assembly 108. The drive assembly 108 generally reduces the rotational speed and increases the torque produced by an engine 120. A drive shaft 122 transfers the torque from the engine 120 to the drive assembly 108. Although the drive assembly 108 is depicted in an external position between the plenum 102 and the engine 120, it will be appreciated that in some embodiments, the drive assembly is positioned inside the plenum proximate to the fan assembly 104. In those alternate embodiments, the length of the fan shaft 118 will be shorter, while the length of the drive shaft 122 will be longer.

Turning to FIGS. 3-7, shown therein are various depictions of the drive assembly 108. The drive assembly 108 includes a fan shaft sheave 124 connected to the fan shaft 118, a driver sheave 126 connected to the drive shaft 122, a belt tensioning assembly 128 and a drive belt 130. The drive belt 130 has an inner side and an outer side. The fan shaft 118 is supported by one or more fan shaft bearings 132 that are connected to the frame assembly 108. The fan shaft bearings 132 may be pillow block bearings and facilitate and control the rotational movement of the fan shaft 118. It will be appreciated that many components of the air-cooled heat exchanger 100 have been removed in FIGS. 3-7 to better illustrate the construction of the drive assembly 108.

The belt tensioning system 128 includes an idler pulley 134, an idler shaft 136, one or more idler shaft bearings 138, an idler bearing shuttle 140, an idler bearing track 142 and an idler bearing adjustment mechanism 144. The idler pulley 134 is connected to the idler shaft 136, which is in turn supported by the idler shaft bearings 138. The idler shaft bearings 138 are attached to the idler bearing shuttle 140, which is configured for linear movement back and forth along the idler bearing track 142. In exemplary embodiments, the idler bearing shuttle 140 includes a pair of plates 146 that ride on the top and bottom of the idler bearing track 142. The plates 146 are connected by bolts 148 that are spaced apart by a distance that is nominally the same as the width of the idler bearing track 142. In this way, the movement of the idler bearing shuttle 140 is confined to a linear displacement along the idler bearing track 142.

The idler bearing adjustment mechanism 144 controls the position of the idler bearing shuttle 140 on the idler bearing track 142. In the exemplary embodiments depicted in FIGS. 3-7, the idler bearing adjustment mechanism 144 includes a threaded adjustment rod 150 that is connected between the frame assembly 112 and the idler bearing shuttle 140. Turning the adjustment rod 150 in a first direction draws the idler bearing shuttle 140 away from the fan shaft sheave 124 and driver sheave 126. Turning the adjustment rod 150 in a second direction pushes the idler bearing shuttle 140 toward the fan shaft sheave 124 and driver sheave 126. Although the threaded adjustment rod 150 is depicted in FIGS. 3-7, it will be appreciated that alternative idler bearing adjustment mechanisms 144 are contemplated within the scope of exemplary embodiments. For example, the idler bearing adjustment mechanism 144 can include a worm-gear that engages teeth on the idler bearing track 142 to advance or retract the idler bearing shuttle 140 on the idler bearing track 142.

Unlike prior art designs, the belt tensioning system 128 applies a compressive force to the drive belt 130 to adjust the tension in the drive belt 130. The idler pulley 134 is positioned on the outside of the drive belt 130 and the idler bearing adjustment mechanism 144 is used to place the idler bearing shuttle 140 in a position on the idler bearing track 142 at which the idler pulley 130 applies the desired force on the outer side of the drive belt 130. Applying tension to the drive belt 130 by forcing the path of the drive belt 130 below the fan shaft sheave 124 increases the belt-wrap contact between the drive belt 130 and the fan shaft sheave 124. This, in turn, increases friction and reduces slippage between the inner side of the drive belt 130 and the fan shaft sheave 124. Thus, in exemplary embodiments, the belt tensioning system 128 provides a drive belt path in which the drive belt 130 does not extend beyond the outer diameter of the fan shaft sheave 124.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms expressed herein. It will be appreciated by those skilled in the art that the teachings of the present invention can be applied to other systems without departing from the scope and spirit of the present invention.

What is claimed is:

1. An air-cooled heat exchanger comprising:
   a frame assembly;
   a plenum supported by the frame assembly;
   an engine, wherein the engine includes a drive shaft;
   a fan assembly configured to move air through the plenum, wherein the fan assembly comprises a fan connected to a fan shaft; and
   a drive assembly connected between the engine and the fan assembly, wherein the drive assembly comprises:
      a fan shaft sheave connected to the fan shaft;
      a driver sheave connected to the drive shaft;
      an idler pulley;

a drive belt having an inner side and an outer side, wherein the inner side of the drive belt contacts the fan shaft sheave and the driver sheave, and wherein the outer side of the drive belt contacts the idler pulley;

an idler shaft connected to the idler pulley;

one or more idler shaft bearings that support the idler shaft;

an idler bearing track;

an idler bearing shuttle configured to receive the idler bearing track and configured for linear movement along a longitudinal axis of the idler bearing track, wherein the one or more idler shaft bearings, idler shaft and idler pulley are attached to the idler bearing shuttle; and an idler bearing adjustment mechanism configured to adjust the position of the idler pulley relative to the drive belt.

2. The air-cooled heat exchanger of claim 1, wherein the idler bearing shuttle comprises:

a pair of plates on opposite sides of the idler bearing track; and a plurality of bolts connected between the pair of plates.

3. The air-cooled heat exchanger of claim 1, wherein the idler bearing adjustment mechanism is configured to adjust the position of the idler bearing shuttle on the idler bearing track.

4. The air-cooled heat exchanger of claim 3, wherein the idler bearing adjustment mechanism includes a threaded adjustment rod that extends between the idler bearing shuttle and the frame assembly of the air-cooled heat exchanger.

5. An air-cooled heat exchanger comprising:

a frame assembly;

a plenum supported by the frame assembly;

an engine, wherein the engine includes a drive shaft;

a fan assembly configured to move air through the plenum, wherein the fan assembly comprises a fan connected to a fan shaft; and a drive assembly connected between the engine and the fan assembly, wherein the drive assembly comprises:

a fan shaft sheave connected to the fan shaft, wherein the fan shaft sheave has a width;

a driver sheave connected to the drive shaft;

an idler pulley;

an idler shaft connected to the idler pulley;

one or more idler shaft bearings that support the idler shaft;

an idler bearing track;

an idler bearing shuttle configured to receive the idler bearing track and configured for linear movement along a longitudinal axis of the idler bearing track, wherein the one or more idler shaft bearings, idler shaft and idler pulley are attached to the idler bearing shuttle;

a drive belt in contact with the fan shaft sheave, the driver sheave and the idler pulley, wherein the drive belt follows a drive belt path that does not extend beyond the width of the fan shaft sheave; and an idler bearing adjustment mechanism configured to adjust the position of the idler pulley relative to the fan shaft.

6. The air-cooled heat exchanger of claim 5, wherein the drive belt has an inner side and an outer side, wherein the inner side of the drive belt contacts the fan shaft sheave and the driver sheave, and wherein the outer side of the drive belt contacts the idler pulley.

7. The air-cooled heat exchanger of claim 5, wherein the idler bearing shuttle comprises:

a pair of plates on opposite sides of the idler bearing track; and a plurality of bolts connected between the pair of plates.

8. The air-cooled heat exchanger of claim 7, wherein the idler bearing adjustment mechanism is configured to adjust the position of the idler bearing shuttle on the idler bearing track.

9. The air-cooled heat exchanger of claim 8, wherein the idler bearing adjustment mechanism includes a threaded adjustment rod that extends between the idler bearing shuttle and the frame assembly of the air-cooled heat exchanger.

* * * * *